United States Patent [19]
Hahn et al.

[11] Patent Number: 5,442,825
[45] Date of Patent: Aug. 22, 1995

[54] DOCK LEVELER WEATHER SEAL

[75] Inventors: Norbert Hahn, Franklin, Wis.; William Triervieler, Dubuque, Iowa; Richard Kellermann, Franklin; Jeff Schwager, Mequon, both of Wis.

[73] Assignee: Rite-Hite Corporation, Milwaukee, Wis.

[21] Appl. No.: 156,231

[22] Filed: Nov. 22, 1993

[51] Int. Cl.⁶ .............................................. E01D 1/00
[52] U.S. Cl. .................................... 14/71.1; 14/71.5; 32/173.2
[58] Field of Search ............... 14/71.1, 71.3, 71.5, 14/71.7; 52/173.2

[56] References Cited

U.S. PATENT DOCUMENTS

| | | |
|---|---|---|
| 712,240 | 10/1902 | Barnes et al. . |
| 1,452,703 | 4/1923 | Pollard . |
| 2,549,284 | 4/1951 | Baker . |
| 3,254,453 | 6/1966 | Dennis . |
| 3,352,314 | 11/1967 | Frommelt et al. . |
| 4,110,860 | 9/1978 | Neff et al. . |
| 4,272,934 | 6/1981 | Cowden et al. . |
| 4,286,410 | 9/1981 | Hahn . |
| 4,293,969 | 10/1981 | Frommelt . |
| 4,422,199 | 12/1983 | Frommelt . |
| 4,426,816 | 1/1984 | Dean et al. . |
| 4,557,008 | 12/1985 | Jurden . |
| 4,601,142 | 7/1986 | Frommelt . |
| 4,691,478 | 9/1987 | Lorg . |
| 4,711,059 | 12/1987 | Layne .............................. 14/71.5 X |
| 4,750,299 | 6/1988 | Frommelt et al. ................ 14/71.5 X |
| 4,805,362 | 2/1989 | Frommelt et al. . |
| 5,048,246 | 9/1991 | Sullivan ............................ 52/173.2 |
| 5,125,196 | 6/1992 | Moody . |
| 5,185,977 | 2/1993 | Brockman et al. . |

FOREIGN PATENT DOCUMENTS 486162  5/1938  United Kingdom .

Primary Examiner—William P. Neuder
Attorney, Agent, or Firm—Leydig, Voit & Mayer, Ltd.

[57] ABSTRACT

A seal assembly is provided for use in a dock leveler used to span a gap between a loading dock and a bed of a vehicle in loading or unloading position in front of the dock. The loading dock has a pit defined by opposing pit walls, a rear wall and a floor. The dock leveler has a frame mounted in the pit, a deck having front and rear portions, with the rear portion pivotally connected to the frame so that the deck can pivot up and down about a horizontal axis between a horizontal position wherein the deck is substantially co-planar with a surface of the dock, a raised, upwardly inclined position, and a lowered, downwardly inclined position. The dock leveler also has opposing deck sides which are adjacent to and move vertically relative to the pit walls. The seal assembly comprises a seal body capable of resiliently and compressibly engaging the deck side and pit wall to form an air-blocking seal and an attachment member for mounting the seal body to either the deck side or pit wall so that said seal body may form the seal when the deck is in the horizontal or lowered position with the other of the deck side or the pit wall. The seal body is preferably mounted in the joint using hook and loop type fasteners.

15 Claims, 4 Drawing Sheets

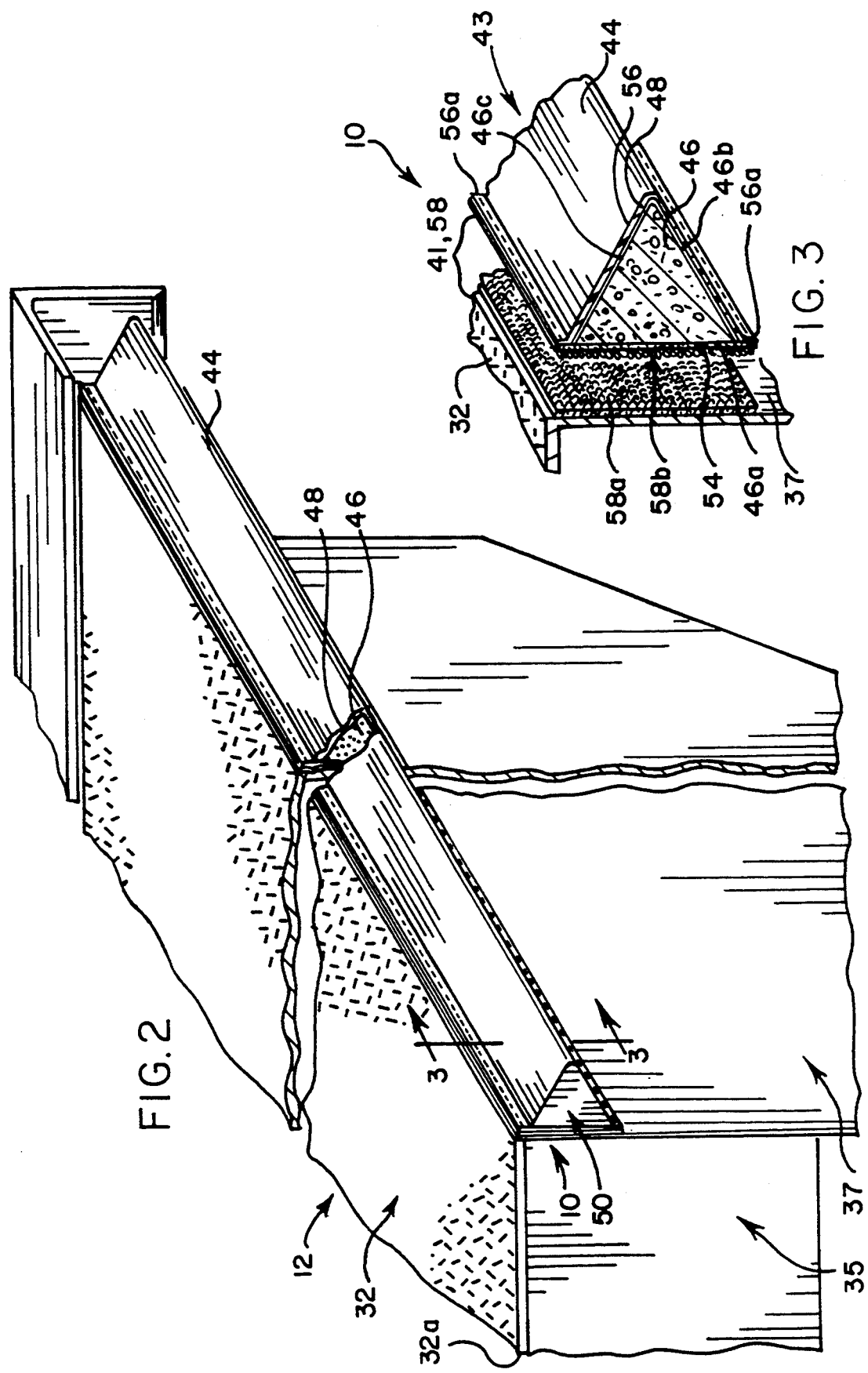

DOCK LEVELER WEATHER SEAL

FIELD OF THE INVENTION

The present invention relates generally to dock levelers and more particularly to a novel weather seal assembly for use with dock levelers.

BACKGROUND OF THE INVENTION

Dock levelers are utilized to compensate for height differences between a dock platform and the bed of a parked vehicle to permit forklift trucks and personnel to readily move on and off the vehicle during loading and unloading operations. A typical dock leveler is mounted within a pit and has a dockboard or deck pivotally connected at its rear edge to a frame mounted within the pit for varying the height of the dock leveler in order to compensate for the height differences. An extension plate or lip is typically pivotally connected to the front edge of the deck for spanning the distance between the rear end of the vehicle bed and the outer front end of the deck and permitting forklift trucks and personnel to safely load and unload the truck without difficulty.

The deck is adapted to pivot between downwardly inclined or lowered positions, a horizontal or level position, and upwardly inclined or raised positions relative to the dock platform. When the dock leveler is not in use, the deck is substantially coplanar with the adjacent, upper surface of the dock. To permit such movement of the deck, a joint is typically formed along the adjacent edges of the deck and loading dock surface. Since dock levelers typically have a portion of the pit and the associated portions of the dock leveler which extend into the interior of the building even when the access door between the loading dock and the building interior is closed, annoying drafts may be created or conditioned air may be lost through the joint unless some type of weather sealing is utilized between the dock leveler and the wall surfaces of the pit in which the leveler is mounted.

The various other types of weather sealing which have been proposed for this purpose heretofore have certain inherent design characteristics which creates one or more of the following shortcomings: (a) an ineffective seal was created in the joint; (b) it was awkward and difficult to install or replace certain components; (c) the useful and effective life of these components was inordinately short, thereby requiring frequent shut down of the dock leveler; (d) it was of costly and complex construction and was ineffective in facilitating proper temperature control within the building interior; and (e) various components were adversely affected by changes in climatic conditions.

OBJECTS AND SUMMARY OF THE INVENTION

Thus, it is an object of the present invention to provide a weather-sealing assembly which minimizes the aforenoted shortcomings of the prior art. A specific object is to provide a seal assembly which effectively seals the joint formed between the dock leveler and the loading dock surface.

Another object of the present invention is to provide a seal assembly which resiliently and compressibly spans the joint so as to maximize surface contact between the seal and the walls of the joint, with a minimum amount of drag resistance.

It is a further object of the present invention to provide a weather-sealing assembly which is of simple, inexpensive construction, and in which the replacement of a component thereof may be readily accomplished without the need for tools and with the expenditure of a minimum amount of manual effort.

It is a still further object to provide a weather sealing assembly which may be attached to new dock leveler equipment prior to the latter being installed in place, or to dock leveler equipment which is already installed and presently in use.

It is a still further object of the invention to provide a weather-sealing assembly capable of being attached to dock leveler equipment which varies in size and configuration over a wide range.

It is also an object to provide a weather-sealing assembly which in no way interferes with the operation of the dock leveler equipment.

A dock leveler is provided having a seal assembly for forming an air-blocking seal in a joint defined between a deck side wall of the dock leveler which moves vertically relative to the side wall of a pit. The seal assembly comprises a seal body capable of resiliently and compressibly engaging the sides of said joint for forming an air-blocking seal in said joint. The seal body has a resilient and compressible pad-like core adapted to sealably engage and deform to the surface contours of the deck side wall and pit wall, thereby maximizing the seal surface between the seal and the joint sides. The seal assembly may have a cover for covering the core comprising one integral cover panel folded around the surface of the core or two or more cover panels which are joined together so as to cover the core.

In one embodiment, the seal body has a substantially triangular cross section wherein one side is adapted to be attached to either the deck side wall or pit wall and the other two sides are adapted to sealably engage the other of the deck side wall or pit wall. The seal body is preferably detachably mounted, using hook and loop type fasteners, subjacent the deck and along at least a portion of the deck side wall and pit wall.

In another embodiment, the seal body has a substantially circular cross section wherein one side is adapted to be attached to one of the deck side wall or pit wall and the other side is adapted to sealably engage the other of the deck side wall or pit wall.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is a perspective view similar to FIG. 1 showing the weather seal assembly mounted on the deck side wall or the toe guard wall of the dock leveler;

FIG. 3 is a sectional view taken along line 3—3 in FIG. 2;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
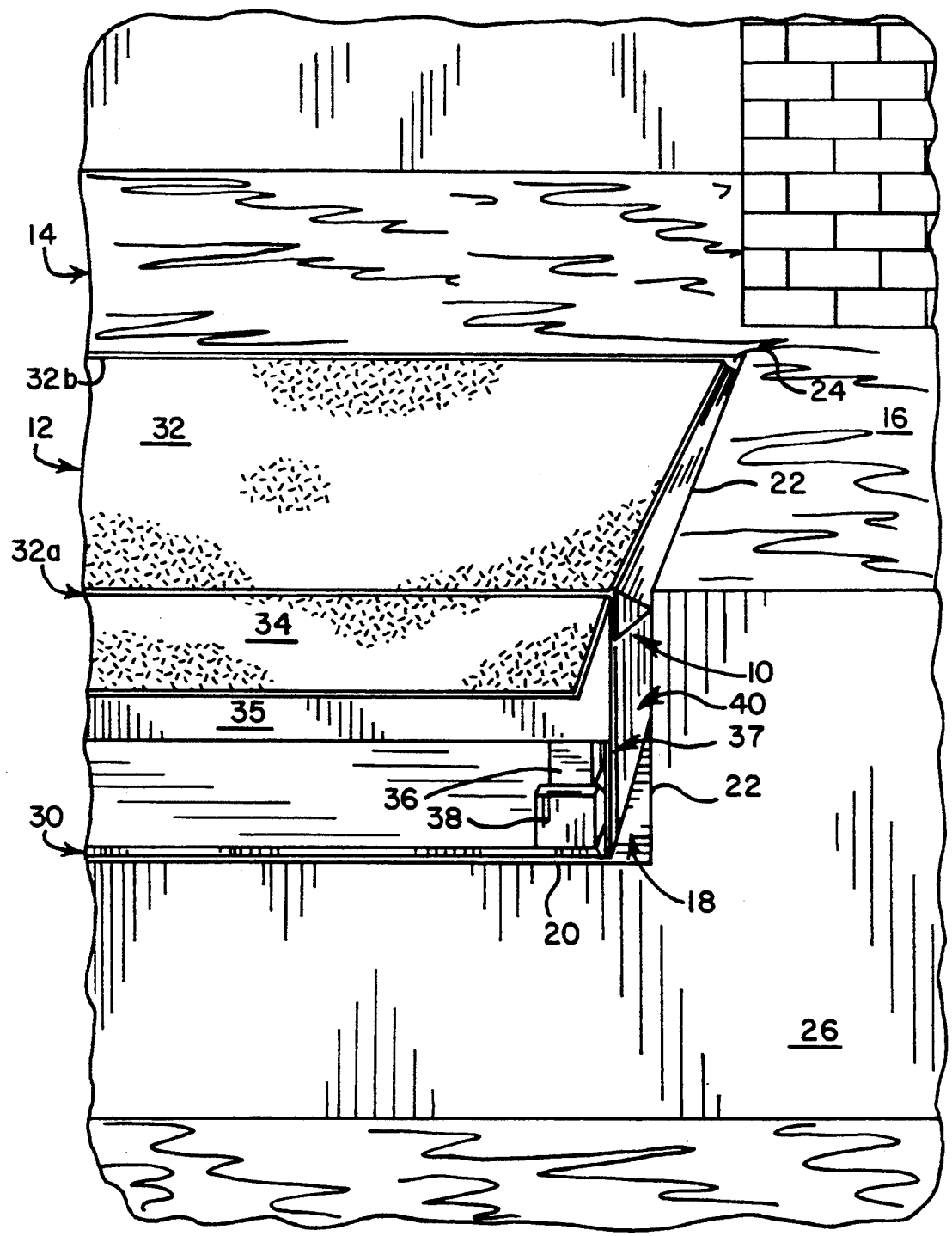
FIG. 1 is a perspective view of a portion of a typical loading dock showing a deck member of a dock leveler in a substantially horizontal disposed position and with one embodiment of a weather seal assembly in accordance with the present invention disposed in the joint formed by the side of the deck member and a side wall of the pit in which the dock leveler is located.

Referring to the drawings and more particularly to FIG. 1, a weather seal assembly 10 in accordance with the present invention is shown mounted between a conventional dock leveler assembly 12 and loading dock 14.

Referring to FIG. 1, the conventional loading dock 14 has a loading surface 16 and a recess or pit 18. The pit 18 has an open top and front defined by a floor 20 and upstanding side and rear walls 22 and 24, respectively. Conventional bumpers (not shown) may be mounted on the dock front wall 26 and adjacent to, but spaced from, the pit side walls 22 which are engaged by the rear of the vehicle (not shown) when the vehicle is backed into a parked position relative to the dock leveler assembly 12. The bumpers prevent the vehicle from striking and damaging the dock wall 26 and the various components of the dock leveler assembly 12.

The dock leveler assembly 12 is of a conventional type adapted to compensate for height differentials and to the span the distance which frequently occur between the loading dock surface 16 and the bed of the vehicle. The dock leveler 12 does not form part of the basic invention but is used in disclosing one application of the improved and novel weather seal assembly 10.

Figure 4:
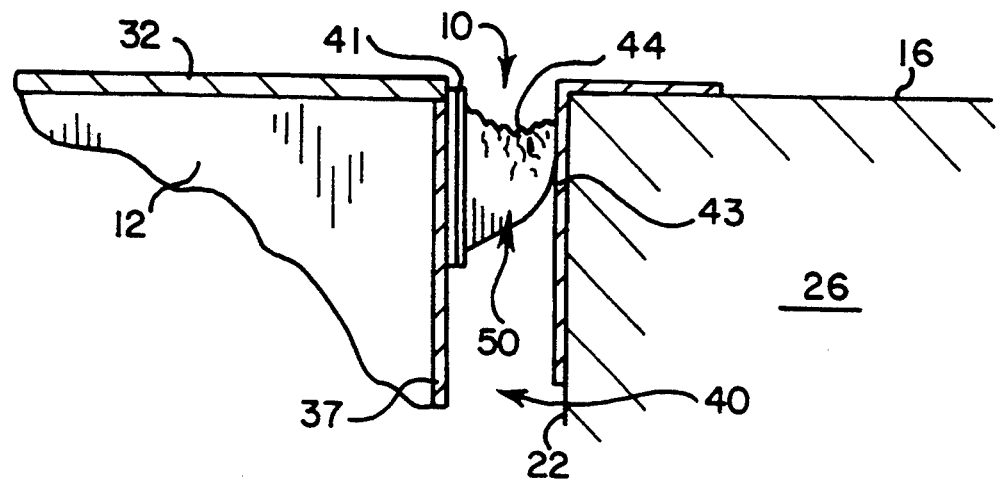
FIG. 4 is an elevational view of FIG. 1 showing the deck substantially co-planar with the loading dock surface and the seal assembly mounted in the joint defined between the toe guard wall and the pit side wall.
Figure 5:
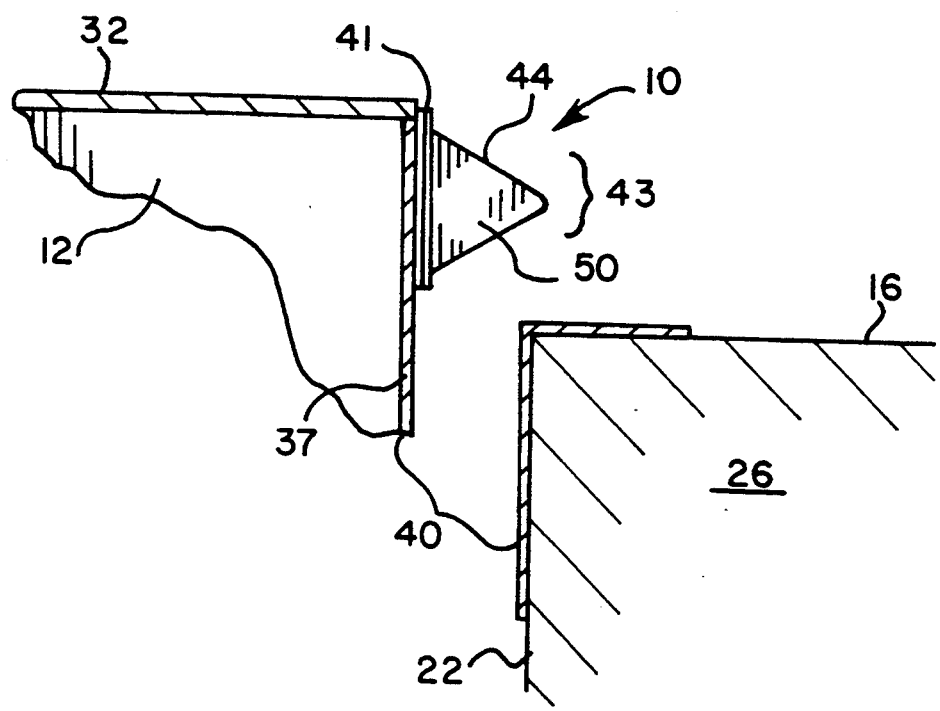
FIG. 5 is like FIG. 4 but showing the deck in a raised position.

The dock leveler assembly 12 includes a frame, generally depicted at 30, mounted to the floor 20 of the recess or pit 18. A ramp or deck 32 is pivotally connected to the frame 30 at the rear of the pit 18 so that the deck 32 can pivot between lowered, level and raised positions as shown in FIGS. 4 and 5, respectively. A lip or extension plate 34 is pivotally connected to a header 35 at the front 32a of the deck 32. Referring to FIGS. 1 and 4-5, it will be seen that the dock leveler 12 has a deck side wall or toe guard wall 37 which is substantially parallel and adjacent with the side wall 22 of the recess 18.

The deck 32 typically has a rectangular configuration adapted to overlie and enclose the open top of the recess 18 and be substantially flush with the dock surface 16 when the deck 32 is not in use (as shown in FIG. 4). A pair of safety legs 36 (only one is shown in FIG. 1) depending from the underside of the deck 32 are adapted to engage upwardly extending stops 38 provided on the floor 20. Means for lifting the deck 32 from the horizontal position shown in FIG. 4 to the raised position in FIG. 5 are conventional and well known and may include a spring-loaded lifting system, a hydraulic lifting system, or the like.

When the dock leveler 12 is being adjusted to accommodate the bed of a parked vehicle, the deck 32 is normally pivoted upwardly, as seen in FIG. 5, so that the lip 34 (shown in FIG. 1) will clear the rear end of the parked vehicle before it is pivoted outwardly to an extended position. Once the lip 34 has assumed its extended position, the deck 32 and lip 34 are lowered as a unit until the lip 34 rests upon the top surface of the vehicle bed. The lip 34 allows a forklift truck and dock personnel to readily move between the deck 32 and the vehicle bed. The lip 34 substantially spans the distance between the bumpers and is preferably formed of steel plate and thus capable of withstanding substantial loads.

When the loading dock 14 is not in use, the deck 32 normally assumes a horizontal position as shown in FIGS. 1 and 4 wherein the exposed top surface of the deck 32 is substantially coplanar with the loading dock surface 16. When deck 32 is in the horizontal position, the deck side or toe guard wall 37 of the dock leveler 12 and the adjacent side wall 22 of the pit 18 form an elongated joint 40 which extends from the open front to the rear wall 24 of the pit 18. A similar joint (not shown) is formed adjacent on the left side of the dock leveler 12. It will be appreciated that the joint 40 disposed between the toe guard wall 37 and the pit side wall 22 is typically difficult to seal because the dock leveler 12 is frequently lowered and raised and in constant use when trucks are present in the loading dock 14.

In accordance with certain objects of the invention, an improved weather seal assembly 10 is provided to seal the joint 40 between the toe guard wall 37 of the deck and the pit side wall 22. The seal assembly 10 functions primarily to form an air-blocking seal or a substantially air-tight seal to minimize conditioned air escaping through the joint 40. In the illustrated embodiment, the seal body 44 may be attached to either the toe guard deck wall 37 or the pit side wall 22 using a conventional hook and loop fastener 58.

Referring to FIGS. 1-3, the weather seal 10 comprises an elongate seal body 44 for forming a resilient and compressible seal in the joint 40 and an attachment member generally depicted as 41 for mounting the seal body 44 in the joint 40. One side of the seal body 44 is adapted to be attached to either the toe guard deck wall 37 or the pit side wall 22 and the other side of the side body 44 slidably and sealably engages the other of either the toe guard deck wall 37 or the pit side wall 22 to form the seal. The seal body 44 comprises a flexible, resilient and compressible pad-like core 46 and preferably a cover 48 made of flexible and durable material. The core 46 and the cover 48 should be durable enough to operate under a wide range of temperature and environmental variations so that when the seal body 44 is in sealing engagement with the side wall 22 or 37, drafts and conditioned air losses caused by the front of the pit being open, will be prevented. Furthermore, the seal body 44 should preferably be imperforate and water and dirt resistant. The core 46 is preferably fabricated from an insulative and deformable material such as urethane foam, but other resilient and compressible materials will be known to those skilled in the art including, for example, cellular polystyrene, polyester fiber, foam rubber and the like.

The seal body 44 may have any cross-sectional shape which is adapted to fit within the joint 40 and sealably engage the toe guard wall 37 and the pit wall 22 to form a proper seal therebetween. In the embodiment of the seal body 44 illustrated in FIG. 3, the core 46 has a generally triangular cross sectional shape defined by sides 46a, 46b, 46c. One side 46a of the core 46 is adjacent to either the toe guard deck wall 37 or the pit side wall 22 and the other two sides 46b, 46c form the surface which slidably and sealably engage the other of the toe guard deck wall 37 or the pit side wall 22 to form a substantially air-tight seal in the joint 40. The seal body 44 should be adapted to conform to the surface contours of the joint 40 and have minimum drag resistance.

The cover 48 is preferably fabricated from a canvas-like fabric material known under the name HYPALON, although any suitable material may be used which is preferably durable, weatherproof, water proof and capable of protecting the core material and well known to those skilled in the art. The cover 48 may be fabricated from a single piece or multiple pieces of fabric. The cover 48 shown in FIG. 3, for illustrative purposes, is formed by a substantially flat first cover panel 54 disposed along the side 46a and a single, second cover panel 56 folded and disposed adjacent the two sides 46b, 46c forming the seal portion 43. The second cover panel 56 has two parallel, longitudinally extending side margins 56a which overlap with the first panel 54. The first and second panels 54, 56 may be attached together by stitching along the side margins 56a, snap buttons, heat melting, adhesives or any other suitable method which will be known to those skilled in the art. The cover 48 may also enclose the ends 50 of the seal body by any suitable method including, for example, adhesives or sewing.

The length of the seal assembly 10 is substantially the same length as the joint 40 while width of the seal body 44 is greater than the width of the joint 40. It should now be appreciated that when the deck 32 is lowered below the horizontal position, the seal portion 43 slidably and resiliently engages the pit side wall 22 so that the seal body 44 is deformed and compressed between the toe guard wall 37 and the pit side wall 22, as generally shown in FIG. 4. It will be appreciated the compression of the seal body 44 in the joint 40 deforms and "bulges" the seal body 44 so as to maximize the surface contact between the seal body 44 and the walls 37, 22 of the joint 40 which enhances the effectiveness of the seal, especially relative to many conventional weather seals which provide only line-contact.

As seen in FIG. 5, when the deck 32 is in a raised position above the horizontal position, the seal assembly 10 is disposed in an inoperative position and the seal body 44 returns to its uncompressed triangular configuration.

In order to attach the seal assembly 10 in the joint 40 between the dock leveler 10 and dock wall 22, the seal body 44 is preferably mounted on the toe guard wall 37 and disposed along the top edge of the joint 40 so that the top of the seal assembly 10 is positioned flush with, or slightly below, the exposed surface of the deck 32. Thus, when the deck 32 is disposed in the horizontal position, no portion of the seal assembly 10 will project upwardly and interfere with the movement of traffic across the deck 32 or supporting surface 16 of the loading dock 14. It is preferred that seal body 44 be disposed subjacent the top edge of the deck 32 thereby facilitating positioning and maintenance of the seal body 44 when the deck 32 is in a raised position as seen in FIG. 5. In the illustrated embodiments, the seal assembly 10 is mounted on the toe guard wall 37 but it will be appreciated that it may also be mounted to the pit side wall 22 of the pit 18.

It is preferable that the attachment member 41 detachably mounts the seal body 44 in the joint 40 so that the seal body 40 may be easily and readily removed and reattached for maintenance and the like. The attachment member 41 is preferably a hook and loop fastener 58, one brand being sold under the name VELCRO. The hook and loop fastener 58 comprises hook and loop strips 58a, 58b, respectively. In the embodiment illustrated in FIG. 3, the loop strip 58b forms the cover panel 54 and is attached to the seal body 44 by any suitable method such as, for example, stitching the cover panel 54 and the side margins 56a of the second cover panel 56 together. After the hook strip 58a is attached to the toe guard deck wall 37, the seal body 44, including the cover panel 54, may be pressed against the hook strip 58a to secure the seal body 44 to the toe guard deck wall 37.

It is preferred that the hook strip 58a be attached to the side wall 22 or 37 defining the joint 40 using an adhesive backing comprising, for example, double sided tape or other adhesive means but any other suitable method known to those skilled in the art may be utilized. The hook and loop fastener 58 permits the replacement of the seal body 44 without the need for any tools. The hook and loop fastener 58 may also act to stiffen and support the seal body 44.

Figure 6:
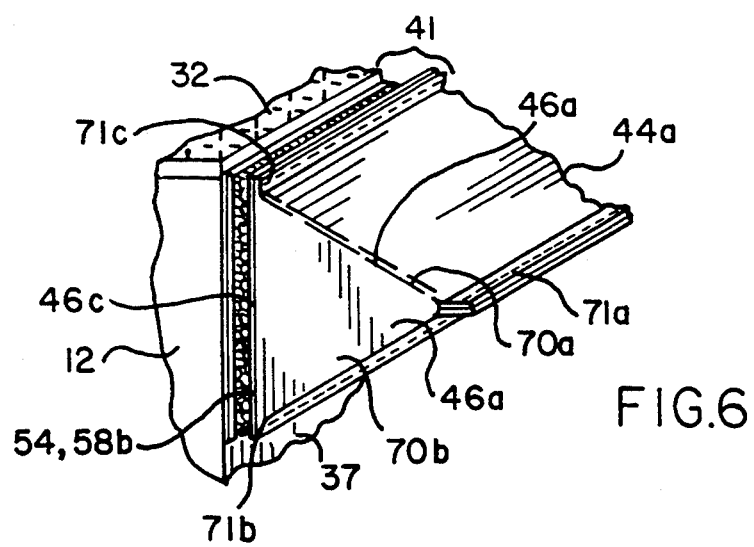
FIGS. 6-8 illustrate other embodiments of the seal body of the weather seal.
Figure 7:
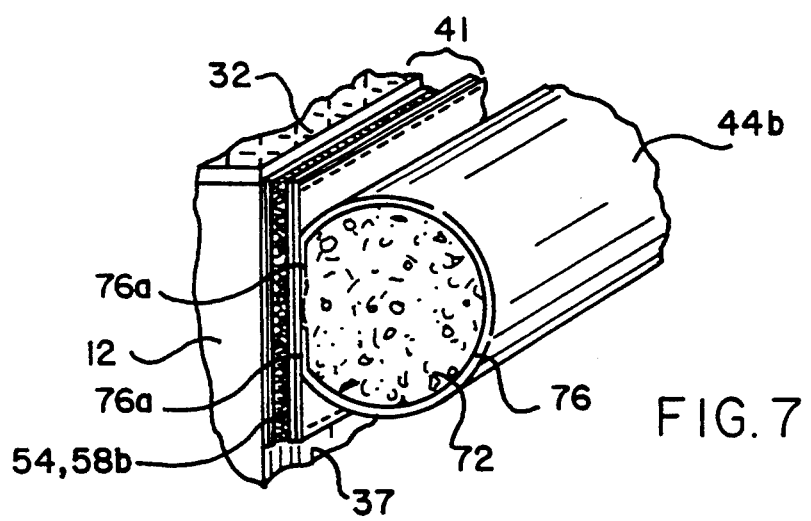
Figure 8:
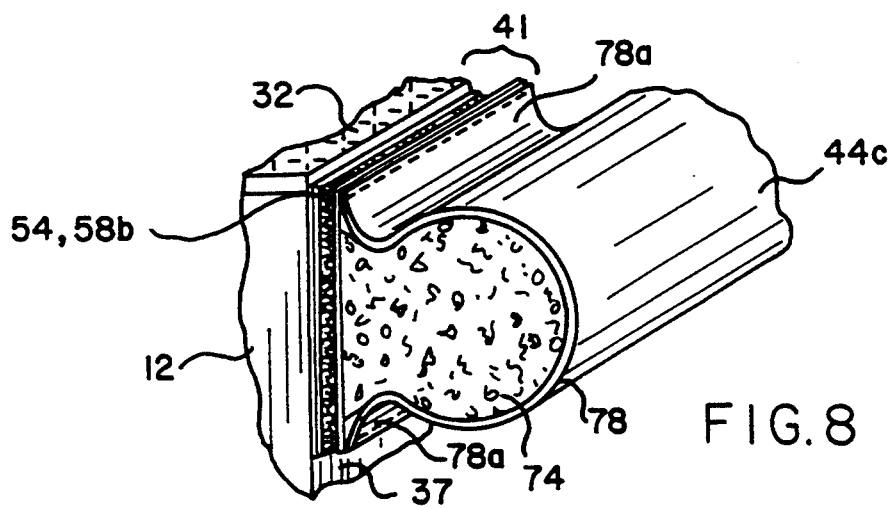

Other embodiments of the seal body 44 are illustrated in FIGS. 6–8. FIG. 6 illustrates a seal body 44A having triangular shaped core 46A, similar to FIGS. 1–5. The cover 70, however, is formed in three units generally depicted as panels 70a and 70b and loop strip panel 58b wherein each panel is generally adjacent each side 46a, 46b, 46c of the core 46. Each cover panel 70a, 70b, 58b has a side margin which is attached to the adjacent panel. The illustrated embodiment shows that the adjacent cover panels 70a, 70b, 58b are attached together along stitch lines 71a, 71b, 71c although other attachment methods may be used.

FIGS. 7–8 illustrate seal bodies 44B, 44C having a substantially circular core 72, 74 and cover members 76, 78, respectively. The covers 76, 78 have two side ends 76a, 78a which are adapted to lie adjacent to the cover panel 54. In FIG. 7, the ends 76a are rolled inward and, in FIG. 8, the ends 78a are rolled outward so that they lie adjacent the loop strip 58b. The ends 76a, 78a of the cover 76, 78 and the cover panel 54 may be suitably attached together.

The rear wall 24 of the pit 18 and the rear edge 32b of the deck 32 may also be provided with a suitable weather seal assembly 10. The weather seal assembly 10 may constitute a strip of seal body 44 carried by the deck member rear edge 32b, which slidably and sealably engages the pit rear wall 24.

Thus, it will be seen that seal assembly 10 and the dock leveler 12 and related sealing devices have been provided which attain the aforenoted objects. Various additional modifications of the described embodiments of the invention specifically illustrated and described herein will be apparent to those skilled in the art, particularly in light of the teachings of this invention. Thus, while preferred embodiments of the present invention have been disclosed, it will be appreciated that it is not limited thereto but may be otherwise embodied with the scope of the following claims.

We claim as our invention:

1. A seal assembly for use in a dock leveler for spanning a loading dock and a bed of a vehicle in loading or unloading position in front of the dock, the loading dock having a pit defined by opposing side walls, a rear wall and a floor, the dock leveler having a frame mounted in said pit, a deck having a front portion and a rear portion that is pivotally connected to said frame so that the deck can pivot up and down about a horizontal axis between a horizontal position wherein the deck is substantially co-planar with a loading surface of the dock, a raised, upwardly inclined position, and a lowered, downwardly inclined position, the dock leveler having opposing deck side walls which are adjacent to and move vertically relative to said pit side walls, the seal assembly comprising a seal body having a compressible core capable of resiliently and compressibly engaging the deck and pit walls to form an air-blocking seal and an attachment member for mounting the seal body to only one of the deck side wall and pit side wall so that said seal body may slidably engage the other of the deck side wall and the pit side wall and form said seal when the deck is in the horizontal or lowered position.

2. The assembly as in claim 1 wherein the attachment member detachably secures the seal body for sealing engagement with at least one of the deck or pit side wall.

3. The assembly as in claim 1 wherein the seal body is disposed at least along a portion of the deck and pit side walls.

4. The assembly as in claim 1 wherein the seal body is disposed subjacent the deck along at least a portion of the deck and pit side walls.

5. The assembly as in claim 1 wherein the uncompressed seal body is wider than the gap between the deck and pit side walls.

6. The assembly as in claim 1 wherein the seal body comprises a cover for covering the core.

7. The assembly as in claim 6 wherein the cover comprises two or more cover panels which are joined together so as to cover the core.

8. The assembly as in claim 1 wherein the seal body has a substantially triangular cross section wherein one side is adapted to be attached to one of the deck or pit side wall and the other sides are adapted to slidably seal against the other of the deck or pit side wall.

9. The assembly as in claim 1 wherein the seal body has a substantially circular cross section wherein one side is adapted to be attached to one of the deck or pit side wall and the other side is adapted to sealably engage the other of the deck or pit side wall.

10. The assembly as in claim 1 wherein the attachment member comprises hook and loop type fasteners.

11. The assembly as in claim 1 wherein one cover panel is defined by a hook and loop fastener.

12. A dock leveler for spanning a gap between a loading dock and a bed of a vehicle in loading or unloading position in front of the dock, the loading dock having a pit defined by opposing side walls, a rear wall and a floor, the dock leveler comprising a frame mounted in said pit, a deck having a front portion and a rear portion that is pivotally connected to said frame so that the deck can pivot up and down about a horizontal axis between a horizontal position wherein the deck is substantially co-planar with a surface of the dock, a raised, upwardly inclined position, and a lowered, downwardly inclined position, the dock leveler having opposing deck side walls which are adjacent to and move vertically relative to said pit walls, and a seal assembly comprising a seal body having a compressible core capable of resiliently and compressibly engaging the deck side wall and pit wall to form an air-blocking seal and an attachment member for mounting the seal body to only one of the deck side wall and pit side wall so that said seal body may slidably engage the other of the deck side wall and pit side wall and form said seal when the deck is in the horizontal or lowered position.

13. The dock leveler as in claim 14 wherein the seal body has dimensions such that the seal body sealably engages the deck side and pit side.

14. A dock leveler for spanning a gap between a loading dock and a bed of a vehicle in loading or unloading position in front of the dock, the loading dock having a pit defined by opposing side walls, a rear wall and a floor, the dock leveler comprising a frame mounted in said pit, a deck having a front portion and a rear portion that is pivotally connected to said frame so that the deck can pivot up and down about a horizontal axis between a horizontal position wherein the deck is substantially coplanar with a surface of the dock, a raised, upwardly inclined position, and a lowered, downwardly inclined position, the dock leveler having opposing deck side walls which are adjacent to and move vertically relative to said pit walls, and a gap defined by said opposing deck and pit side walls, a seal body having a compressible core capable of resiliently and compressibly engaging said joint for forming an air-blocking seal in said gap and an attachment member for mounting the seal body to only one of the deck and the pit side wall so that the seal body may slidably engage the other of the deck and the pit side wall.

15. A dock leveler for spanning a gap between a loading dock and a bed of a vehicle in loading or unloading position in front of the dock, the loading dock having a pit defined by opposing side walls, a rear wall and a floor, the dock leveler comprising a frame mounted in said pit, a deck having a front portion and a rear portion that is pivotally connected to said frame so that the deck can pivot up and down about a horizontal axis between a horizontal position wherein the deck is substantially co-planar with a surface of the dock, a raised, upwardly inclined position, and a lowered, downwardly inclined position, the dock leveler having opposing deck side walls which are adjacent to and move vertically relative to said pit walls, and a gap defined between deck and pit side walls, and an elongated seal assembly having an attachment portion adapted to attach to only one of the deck side wall and the pit side wall and a resilient and compressible seal body extending from the attachment portion and adapted to span the gap to resiliently and sealably engage the other of the deck side wall and pit side wall.

* * * * *